United States Patent [19]

Sidery

[11] 4,283,357
[45] Aug. 11, 1981

[54] DEVICE FOR DISTRIBUTION OF A GAS IN A LIQUID MEDIUM

[75] Inventor: David Sidery, Trondheim, Norway

[73] Assignee: Trodhjems Mek. Versted A/S, Trondheim, Norway

[21] Appl. No.: 143,893

[22] Filed: Apr. 25, 1980

Related U.S. Application Data

[63] Continuation of Ser. No. 12,737, Feb. 16, 1979, abandoned.

[30] Foreign Application Priority Data

Feb. 28, 1978 [NO] Norway .................................. 780694

[51] Int. Cl.$^3$ ............................................... B01F 3/04
[52] U.S. Cl. ..................................... 261/87; 209/170; 366/102; 366/302
[58] Field of Search ............... 366/102, 169, 171, 263, 366/264, 265, 302, 604; 261/87; 209/169, 170; 68/183

[56] References Cited

U.S. PATENT DOCUMENTS

| 780,260 | 1/1905 | Beemer | 261/87 X |
| 2,217,231 | 10/1940 | Morse | 261/87 X |
| 2,609,097 | 9/1952 | Dering | 261/87 X |
| 2,767,964 | 10/1956 | Potts | 261/87 |
| 2,873,600 | 2/1959 | Demaret | 261/87 X |
| 3,070,229 | 12/1962 | Benozzo | 261/87 X |
| 3,414,245 | 12/1968 | Frazer | 366/102 X |
| 4,078,026 | 3/1978 | Fallenius | 261/87 |

*Primary Examiner*—Philip R. Coe

[57] ABSTRACT

A rotor for the distribution of air in the form of finely divided bubbles in the slurry in a flotation tank comprises a boss with an inner hollow air passageway, spaced-apart wings extending radially outwardly from the outer surface of the boss, and multiple air conduits communicating between the inner hollow air passageway and the surface of the boss between each adjacent pair of wings. The air conduits have outer mouths located immediately behind a wing (behind in the sense of rotational direction of the rotor) and linearly extend to the inner hollow air passageway such that lines through their central axes will intercept with imaginary radial lines passing through the centers of the wings behind which the outer mouths of the respective air conduits are located.

8 Claims, 5 Drawing Figures

DEVICE FOR DISTRIBUTION OF A GAS IN A LIQUID MEDIUM

This application is a continuation application of application Ser. No. 012,737, filed Feb. 16, 1979, which was abandoned Apr. 25, 1980.

BACKGROUND OF THE INVENTION

1. Field of the Invention

The instant invention relates to a device for the introduction of a gas in a finely divided form into a liquid medium, and more particularly to a rotor for the introduction of air in a finely divided form in an flotation device.

2. The Prior Art

Flotation is a well-known technique used to separate one or more valuable constituents from unwanted constituents. A typical field of use for flotation is in the enrichment of ores in which finely divided air is introduced into an aquous suspension of finely divided ore and water. The finely divided air bubbles will adhere to the metal values of the ore and carry the same to the surface of the basin in which the flotation is carried out. The metal values and the air bubbles will usually form a foam on the surface which can be removed by skimming.

In order to improve the selectivity and effectiveness of the flotation process certain adjuvants such as surface active agents are added to the suspension. These agents bring about a better adhesion between the metal values and the air bubbles.

A general account of the flotation process is inter alia found in Kirk-Othmer, "Encyclopedia of Chemical Technology", second edition, volume 9, pages 380-398.

The air can be introduced in the suspension of the finely divided material in different ways; for instance, water saturated with air under pressure can be introduced to the suspension and, as a consequence of the pressure release, the absorbed air will be liberated in the form of finely divided bubbles.

However, the most common manner in which the air is finely divided is by means of mechanical agitation, for instance by means of a rotor which more or less "whips" added air into the suspension.

Such mechanical devices are inter alia described in Norwegian Pat. No. 116,156, U.S. Pat. Nos. 2,609,097 3,070,229, 3,327,851, 3,393,802, 3,393,803, 3,409,130, 3,437,203, 3,485,484 and 3,752,313 and German DOS No. 26.59.230.

For flotation purposes it is desirable for the added air to exhibit the greatest possible surface area with respect to the added volume of air, that is, the air should be introduced in the form of very finely divided and minute bubbles.

In U.S. Pat. No. 2,609,097 a rotor is described into which air is introduced centrally via a supply pipe and is radially distributed to the suspension via a number of conduits leading to the periphery of the rotor, these conduits opening into a groove, one side of which is formed in such a manner that the air, during the rotation of the rotor, is forced into the adjacent suspension.

U.S. Pat. No. 3,485,484 discloses for instance a rotor in which the air is centrally supplied and led out through conduits in the wings of the rotor and thus forced into the surrounding suspension.

SUMMARY OF THE PRESENT INVENTION

According to the instant invention a rotor or an impeller is provided for introduction of air into a liquid medium wherein the rotor is so designed that a more efficient distribution of very finely divided air bubbles are obtained in the suspension. The minute and finely divided air bubbles will rise slowly through the suspension and thereby increase the possibility of contact being established between desired particles to be floated and one or more air bubbles, whereby the effectiveness of the flotation is increased.

According to the invention this object is obtained using a structure wherein centrally supplied air from a suitable source and at a suitable pressure and further under the action of the rotation of the impeller via conduits is guided tangentially from a central supply conduit. The air initially forced into the suspension in the form of relatively large air bubbles will further be broken down to smaller bubbles due to vortex formation behind the rotor blade and by collision with the subsequent rotor blade. The final distribution of the air bubbles thus formed occurs when the suspension containing the air bubbles impinges on stationary restrictions being arranged in a circular manner around and in a suitable distance from the impeller. Thus, the air is first dispersed by the air bubbles formed being disintegrated to smaller bubbles by colliding with the rotor wings. Subsequently, the partially dispersed air is further dispersed by collision against stator wings arranged around the impeller in a circular pattern.

DESCRIPTION OF THE DRAWINGS

The object of the invention is attained in the preferred embodiment of the invention described in the accompanying description, and illustrated in the accompanying drawings.

DESCRIPTION OF THE PREFERRED EMBODIMENT

Figure 1:
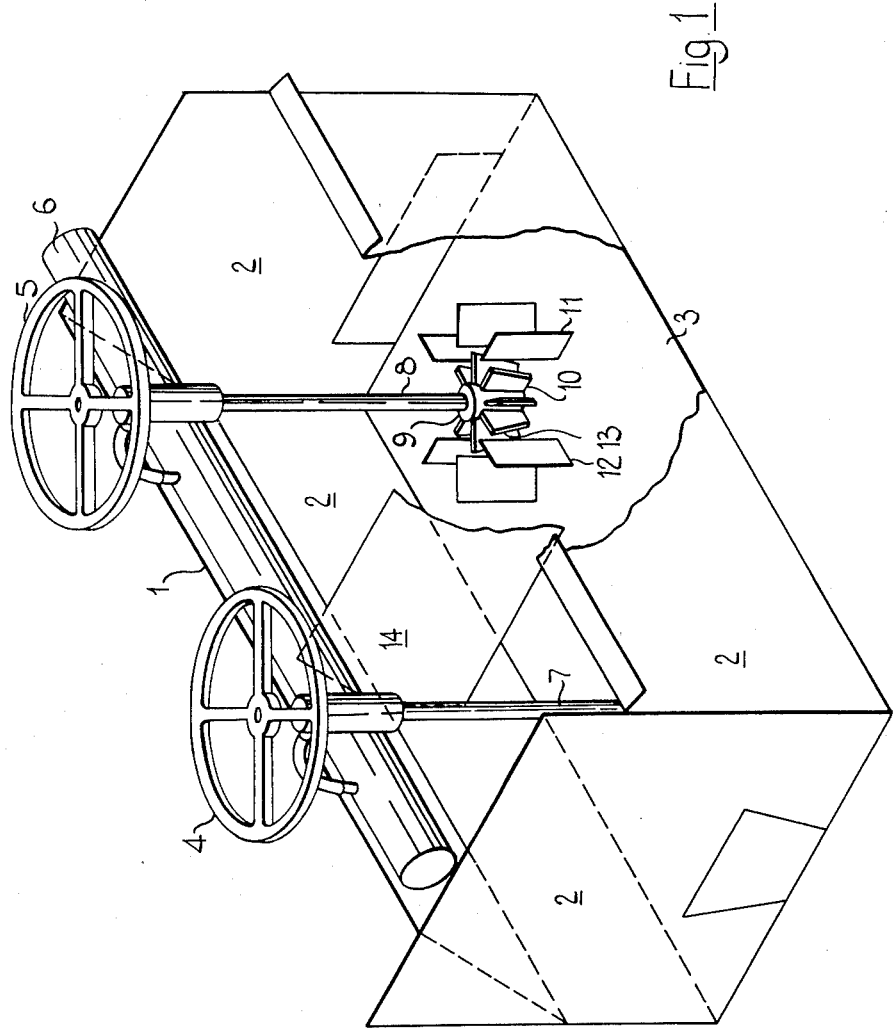
In FIG. 1 a flotation device is shown partly in section, employing the inventive rotor or impeller.
Figure 2:
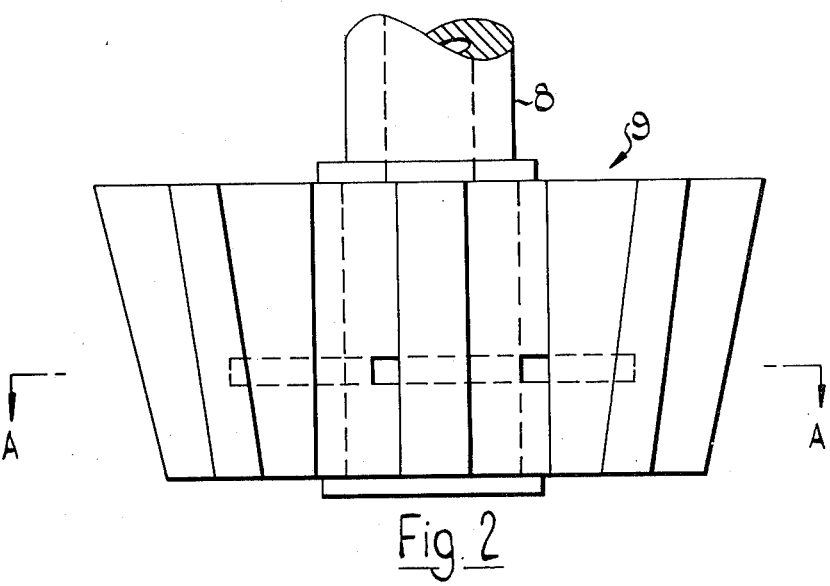
FIG. 2 shows a side view of the rotor.

In FIG. 1 the essential elements of a flotation vessel 1 are indicated, comprising side walls 2 and a bottom part 3. In the example shown two impellers 4 and 5 are driven by a common driving device (not shown) in such a manner that both the impellers rotate with the same rotational speed.

Further, air is supplied from the pressure tank 6 to the impellers 4 and 5 via hollow driving shafts 7 and 8 at a pre-determined pressure varying in accordance with the consistency of the suspension. Fixed to the lower part of the driving shafts 7 and 8 are impellers or rotors 9 the lower part 10 of which is at a pre-determined distance from the bottom 3.

A number of stator wings 11 are secured to the bottom 3 of the tank in a circular pattern around the rotor 9, with suitable clearance between the inner edges 12 of the stator 11 and the radial impeller wings 13 extending away from the outer surface of the boss portion of the rotor 9. The individual radial impeller wings 13 all have a rectangular cross section (see FIG. 4).

A partition 14 partially divides the vessel 1 into two compartments.

Figure 3:
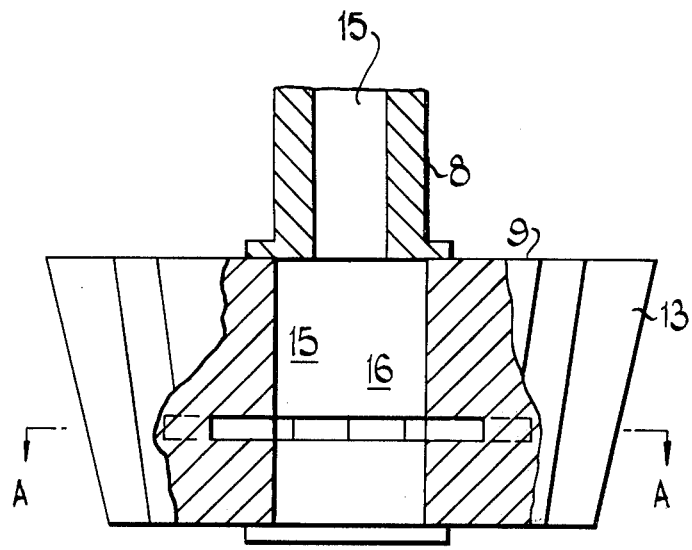
FIG. 3 is a side view, partially in section, of the rotor.

FIG. 3 shows the generally cylindrical hollow part 15 of the driving shaft 8, through which compressed air is supplied to the impeller 9 from the pressure vessel 6.

Figure 4:
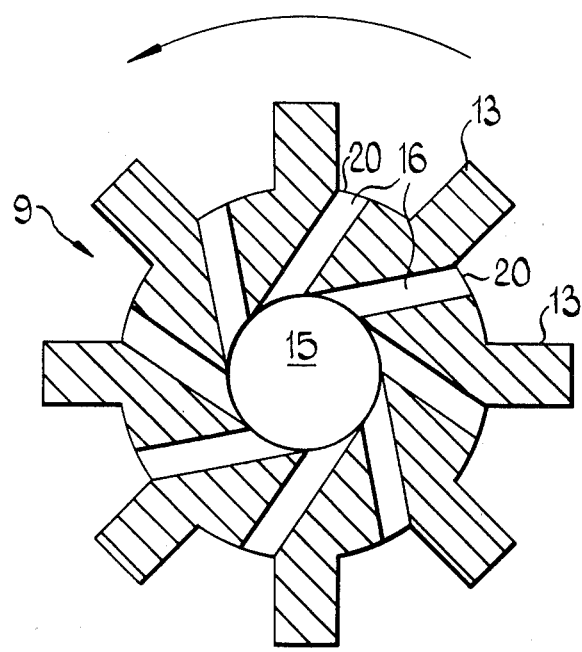
FIG. 4 shows a cross-section along the line A—A in FIGS. 2 and 3.

FIG. 4 shows the air conduits 16 of the impeller 9. It can be seen that the air conduits 16 extend away from the wall of the rotor 9 which forms the periphery of the generally cylindrical hollow area 15 to an exit mouth 20 located between two adjacent wings 13. In fact, the exit mouths 20 are located at a point on the surface of the boss portion 9' of rotor 9 just behind a wing 13 (behind in the sense of the direction of rotation of the rotor 9). Preferably, the air conduits 16 are linear and are so positioned within the boss portion of rotor 9 that lines through their central axes will intercept with imaginary radial lines passing through the centers of the wings behind which the mouths of the respective air conduits are located at angles ranging from 20°-60°. Most preferably, and as seen in either FIG. 4 or 5, when the rotor is viewed through a central horizontal cross-section, the longer sides of the conduits will terminate at the periphery of the generally cylindrical hollow area 15 in a generally tangential fashion and at a point along an imaginary radial line passing through the center of the wing which is ahead of the wing behind which the exit mouths of the respective air conduits are located, and the shorter sides will terminate at the periphery of the generally cylindrical hollow area 15 at a point along an imaginary radial line passing through the center of the wing immediately behind which the exit mouths of the respective air conduits are located.

Figure 5:
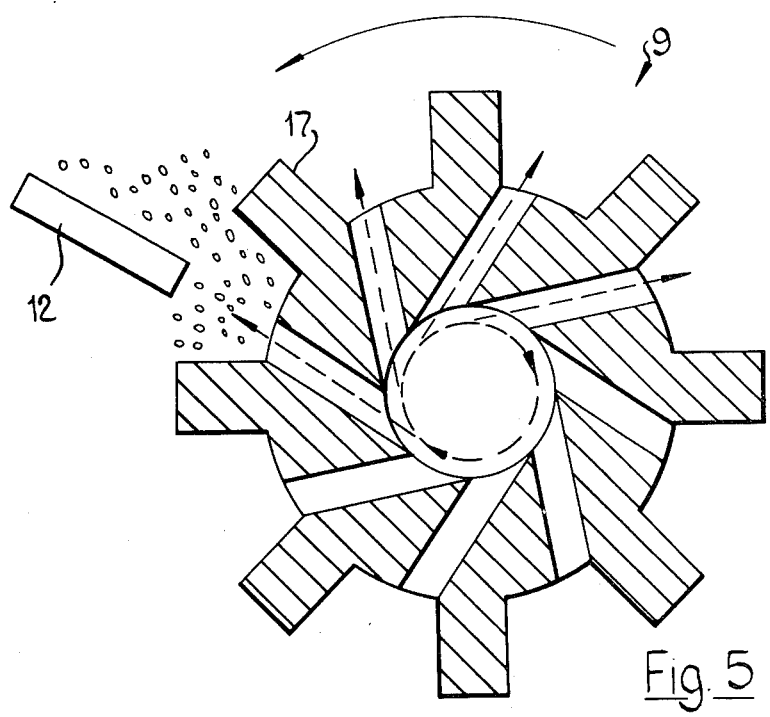
FIG. 5 showing a cross-section similar to that in FIG. 4, indicates how the injected air is broken down when the rotor is in a working mode.

FIG. 5 shows the relative movement of the air with respect to the rotating rotor. The air from the pressure tank 6 is supplied to the generally cylindrical hollow area 15 in the rotor 9 at a pressure adapted to the consistency of the suspension. For a relatively dilute suspension a pressure of for instance 0.2 kp/cm$^2$ will be sufficient.

During production stops, for instance by failure of the power supply, the suspended particles will descend to the bottom 3 and build up a layer which can have a thickness sufficient to cover the impeller. During start-up a considerable torque is necessary in order to liberate the impeller from the settled particles, resulting in a very hich power consumption during start-up. According to the invention this problem can be eliminated by constructing the impeller of rubber or a similar elastic material permitting the wings 13 to yield during start-up and be forced against the boss of the rotor, whereby the starting torque is considerably reduced. In order to further reduce the starting torque, the stiffness of the wings can be reduced by giving the wings a gradually decreasing thickness such that the lower parts of the wings have a smaller thickness than the upper part. In this manner (not shown in the drawings) the lower part of the wings will be more flexible than the upper part. A reduced bending stiffness of the lower part of the wings 13 can optionally be obtained by providing the lower part of the wings with suitable grooves or holes.

Tests with the device according to the invention in a flotation plant have shown that when the wings are made from an elastic material and provided with a declining thickness, as indicated above, the flotation plant can be re-started without the manual aid normally being necessary when starting-up a conventional plant with impellers of non-elastic material.

I claim:

1. A rotatable rotor device for the introduction and dispersion of a gas in a liquid medium which comprises
   an elongated boss portion having a top surface, a bottom surface and an outer side surface, as well as an axial hollow area therein for the introduction of air under pressure,
   a number of spaced apart, radially-projecting wings connected to the outer side surface of said boss and extending between the top surface and bottom surfaces of said boss, each of said wings, when viewed in horizontal cross section, having a rectangular cross section, and
   a separate air conduit extending between said hollow area in said boss and the outer side surface of said boss between each pair of wings, the exit mouth of each air conduit communicating with the outer surface of the boss immediately adjacent an associated wing, each exit mouth of each air conduit being positioned on a corresponding side of an associated wing, and each air conduit extending towards said hollow area and communicating therewith via an inner mouth such that a center line through each air conduit will intercept an imaginary radial line extending centrally through the associated wing adjacent to which the exit mouth of the air conduit is located.

2. The rotatable rotor device according to claim 1, wherein the center line through each conduit intercepts the imaginary radial line through the associated wing at an angle between 20° and 60°.

3. The rotatable rotor device according to claim 1, wherein the axial hollow area in said boss is generally cylindrical, wherein each conduit is tubular, and wherein when each conduit is viewed in horizontal cross section which extends through the center line the conduit, one side thereof will terminate at the periphery of said generally cylindrical hollow area in an approximately tangential fashion.

4. The rotatable device according to claim 3 wherein each of the conduits will be located in the same horizontal cross section through said rotor device, and wherein the longer side of each conduit, when viewed in a horizontal cross section that extends through the center lines of the conduits, will also terminate at the periphery of the generally cylindrical hollow area at a point along an imaginary radial line passing through the center of the wing which is located on the opposite side of the wing adjacent to which the exit mouth of the air conduit is immediately adjacent, and the shorter side will terminate at the periphery of the generally cylindrical hollow area at a point along an imaginary radial line passing through the center of the associated wing to which the exit mouth of the air conduit is immediately adjacent.

5. The rotatable rotor device according to claim 1, wherein each of the wings is constructed of an elastic material.

6. The rotatable rotor device according to claim 1, wherein each wing is constructed such that the portion nearest the bottom surface of the boss exhibits a lower bending stiffness than the portion nearest the top surface of the boss.

7. The rotatable rotor device according to claim 6, wherein each wing projects away from the boss a decreasing amount as it extends between the top surface and the bottom surface of the boss.

8. A device for the introduction and dispersion of a gas in a liquid medium which comprises
- a tank for containing the liquid medium,
- at least one rotatable rotor mounted so as to be positioned in the tank and below the liquid level therein,
- a stator means supported by said tank to surround each of said rotatable rotors, each stator means comprising a number of stator wings radially positioned with respect to a center line through the enclosed rotor,
- each said rotatable rotor comprising
  - an elongated boss portion having a top surface, a bottom surface and an outer side surface, as well as an axial hollow area therein for the introduction of air under pressure,
  - a number of spaced apart, radially-projecting wings connected to the outer side surface of said boss and extending between the top surface and bottom surfaces, each of said wings, when viewed in horizontal cross section having a rectangular cross section, and
- a separate air conduit connecting said hollow area in said boss with the outer side surface of said boss between each adjacent pair of wings, the exit mouth of each air conduit communicating with the outer surface of the boss immediately adjacent an associated wing, each exit mouth of each air conduit being positioned on a corresponding side of an associated wing, and each air conduit extending towards said hollow area and communicating therewith via an inner mouth such that a center line through each air conduit will intercept an imaginary radial line extending centrally through the associated wing adjacent to which the exit mouth of the air conduit is located.

* * * * *